(12) United States Patent
Stratton et al.

(10) Patent No.: US 11,436,780 B2
(45) Date of Patent: Sep. 6, 2022

(54) MATCHING MOUTH SHAPE AND MOVEMENT IN DIGITAL VIDEO TO ALTERNATIVE AUDIO

(71) Applicant: WARNER BROS. ENTERTAINMENT INC., Burbank, CA (US)

(72) Inventors: Tom David Stratton, Los Angeles, CA (US); Shaun Lile, Burbank, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

(21) Appl. No.: 17/102,399

(22) Filed: Nov. 23, 2020

(65) Prior Publication Data

US 2021/0150793 A1    May 20, 2021

Related U.S. Application Data

(63) Continuation of application No. PCT/US2019/033862, filed on May 23, 2019.
(Continued)

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/246* (2017.01); *G06T 7/73* (2017.01); *G06T 13/205* (2013.01);
(Continued)

(58) Field of Classification Search
CPC .......... G06T 13/40; G06T 7/246; G06T 7/73; G06T 13/205; G06T 2207/10016;
(Continued)

(56) References Cited

U.S. PATENT DOCUMENTS 6,492,990 B1    12/2002   Peleg et al.
6,697,120 B1 *   2/2004   Haisma ................. G06T 13/205
                                                              348/515
(Continued)

OTHER PUBLICATIONS

WO, PCT/US2019/033862 ISR and Written Opinion, dated Oct. 17, 2019.
(Continued)

*Primary Examiner* — David T Welch
(74) *Attorney, Agent, or Firm* — One LLP; Jonathan Jaech (57) ABSTRACT

A method for matching mouth shape and movement in digital video to alternative audio includes deriving a sequence of facial poses including mouth shapes for an actor from a source digital video. Each pose in the sequence of facial poses corresponds to a middle position of each audio sample. The method further includes generating an animated face mesh based on the sequence of facial poses and the source digital video, transferring tracked expressions from the animated face mesh or the target video to the source video, and generating a rough output video that includes transfers of the tracked expressions. The method further includes generating a finished video at least in part by refining the rough video using a parametric autoencoder trained on mouth shapes in the animated face mesh or the target video. One or more computers may perform the operations of the method.

22 Claims, 8 Drawing Sheets

Related U.S. Application Data (60) Provisional application No. 62/676,111, filed on May 24, 2018.

(51) Int. Cl.
   *G06T 7/73* (2017.01)
   *G06T 13/20* (2011.01)
   *G10L 13/047* (2013.01)
   *G10L 15/16* (2006.01)

(52) U.S. Cl.
   CPC ............ *G10L 13/047* (2013.01); *G10L 15/16* (2013.01); *G06T 2207/10016* (2013.01); *G06T 2207/20081* (2013.01); *G06T 2207/20084* (2013.01); *G06T 2207/20132* (2013.01); *G06T 2207/30201* (2013.01)

(58) Field of Classification Search
   CPC . G06T 2207/20081; G06T 2207/20084; G06T 2207/20132; G06T 2207/30201
   See application file for complete search history.

(56) References Cited

U.S. PATENT DOCUMENTS

| | | | | |
|---|---|---|---|---|
| 6,735,566 | B1* | 5/2004 | Brand | G06K 9/6297 345/473 |
| 9,697,833 | B2* | 7/2017 | Marcheret | G06K 9/66 |
| 2004/0107103 | A1* | 6/2004 | Iyengar | 704/270 |
| 2004/0120554 | A1* | 6/2004 | Lin | G06K 9/00335 382/118 |
| 2012/0130717 | A1* | 5/2012 | Xu | H04L 51/10 704/258 |
| 2014/0185924 | A1* | 7/2014 | Cao | G06K 9/6209 382/159 |
| 2014/0372100 | A1 | 12/2014 | Jeong et al. | |
| 2017/0011745 | A1* | 1/2017 | Navaratnam | G06Q 30/016 |
| 2017/0213076 | A1* | 7/2017 | Francisco | G06K 9/00228 |
| 2017/0337682 | A1* | 11/2017 | Liao | G06T 7/30 |
| 2018/0068463 | A1* | 3/2018 | Risser | G06T 7/45 |
| 2018/0268806 | A1* | 9/2018 | Chun | G10L 19/00 |
| 2019/0057714 | A1* | 2/2019 | Scholar | G10L 13/08 |
| 2019/0265802 | A1* | 8/2019 | Parshionikar | G06F 3/012 |
| 2019/0279642 | A1* | 9/2019 | Shukla | G10L 15/22 |
| 2019/0325633 | A1* | 10/2019 | Miller, IV | G06F 3/04847 |
| 2019/0371318 | A1* | 12/2019 | Shukla | G10L 15/32 |
| 2020/0097767 | A1* | 3/2020 | Perry | G06K 9/00604 |
| 2020/0106708 | A1* | 4/2020 | Sleevi | H04L 63/08 |
| 2020/0160581 | A1* | 5/2020 | Heller | G06K 9/00744 |
| 2020/0311572 | A1* | 10/2020 | Baker | G06N 3/0454 |
| 2021/0012549 | A1* | 1/2021 | Comer | G06K 9/00288 |

OTHER PUBLICATIONS

Coldeway, D., Forget DeepFakes, Deep Video Portraits are way better (and worse), retrieved from https://techcrunch.com/2018/06/04/forget-deepfakes-deep-video-portraits-are-way-better-and-worse/, 2018, pp. 1-8.

"Deepfakes", retrieved from https://github.com/deepfakes, 1 page, Jul. 16, 2021.

Deepfakes Club, retrieved from https://twitter.com/deepfakesclub?lang=en, 2018, pp. 1-13.

Thies, J., et al., "Face2Face: Real-time Face Capture and Reenactment of RGB Videos", retrieved from https://openaccess.thecvf.com/content_cvpr_2016/papers/Thies_Face2Face_Real-Time_Face_CVPR_2016_paper.pdf, pp. 2387-2395.

Karras, T., et al., "Audio-Driven Facial Animation by Joint End-to-End Learning of Pose and Emotion", ACM Transactions on Graphics, 217, vol. 36, No. 4, pp. 94:1-94:12, Jul. 2017.

Kumar, R., et al., "ObamaNet: Photo-realistic lip-sync from text", 31st Conference on Neural Information Processing Systems, 2017, Long Beach, CA, pp. 1-4.

Suwajanakorn, S., et al., "Synthesizing Obama: Learning Lip Sync from Audio", ACM Transactions on Graphics, 2017, vol. 36, No. 4, pp. 95:1-95:13.

Tran, D.L., et al., "DeepCoder: Semi-parametric Variational Autoencoders for Automatic Facial Action Coding", Proceedings of the IEEE International Conference on Computer Vision, 2017, pp. 3190-3199.

* cited by examiner

MATCHING MOUTH SHAPE AND MOVEMENT IN DIGITAL VIDEO TO ALTERNATIVE AUDIO

CROSS-REFERENCE TO RELATED APPLICATIONS

The present application is a continuation of International Application No. PCT/US19/33862, filed May 23, 2019, which claims priority to U.S. Provisional Patent Application No. 62/676,111, filed May 24, 2018, the disclosures of both of which are incorporated herein by reference.

FIELD

The present application relates to digital image processing, and more particularly to systems or methods for matching mouth shape and movement in digital video to alternative audio.

BACKGROUND

Producers of video content often desire to use recorded audio that does not match the images recorded in a motion picture. This can happen for several reasons including, for example, when the dialogue is changed after video capture for creative or legal reasons or when the dialog is recorded in a different language than was spoken by the actor during a performance for distribution to different audiences. Consumers of video content, however, often notice mouth movement that does not match the spoken dialog in timing or the shape of the mouth. Mismatch in either of these qualities can distract the consumer, reduce suspension of disbelief and diminish enjoyment of the video content.

Each frame of recorded video can be altered after the video capture so that the actors' mouth movements better align with accompanying speech and dialog in the audio track. However, methods for altering recorded video are too time-consuming and expensive to be feasible in most releases, diminishing the appeal, reach, and profitability of movies and other video content containing dialog that fails to match actor mouth movement and related facial movement. No prior approach attains a high enough quality at a cost feasible for distribution of cinematic or other commercial video content. Because of the great diversity in actors and image capture parameters used in commercial video, material available for training neural networks and other machine learning algorithms is seldom available in enough quantity to eliminate perceptible mismatch between dialog and mouth movement, and acquiring sufficient training video may be prohibitively expensive or impossible.

It would be desirable, therefore, to develop new methods and other new technologies for matching mouth shape and movement in digital video to alternative audio after initial capture of images and sound that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a method for matching mouth shape and movement in digital video to alternative audio includes deriving a sequence of facial poses including mouth shapes for an actor from a source digital video in which the actor appears. Each shape in the sequence of shapes corresponds to a middle position of each sample of alternative audio. The method further includes generating an animated face mesh based on the sequence of facial poses and the source digital video. Optionally, the method may include generating a target video by rendering the animated face mesh. The method further includes transferring tracked expressions from at least one of the animated face mesh or the target video to the source video and generating a rough output video that includes transfers of the tracked expressions. The method further includes generating a finished video at least in part by refining the rough video using a parametric autoencoder trained on mouth shapes in animated face mesh or the target video. One or more computers may perform the operations of the method.

The methods described herein provide an automated process for modifying motion picture images or other video so that the mouth shapes and timing of mouth movement of people who appear in the images look more natural when accompanied by an audio recording that does not match speech that was recorded with the original video. Applications for the methods may include, for example, changing the dialog of video content in post-production, providing a translated dialog, or editing content after release to avoid giving offense due to changed cultural norms or other cultural diversity factors, to avoid legal liability, to improve creative impact or for any other reason.

An apparatus for performing the method may include at least one computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects and novel combinations of elements.

Figure 1:
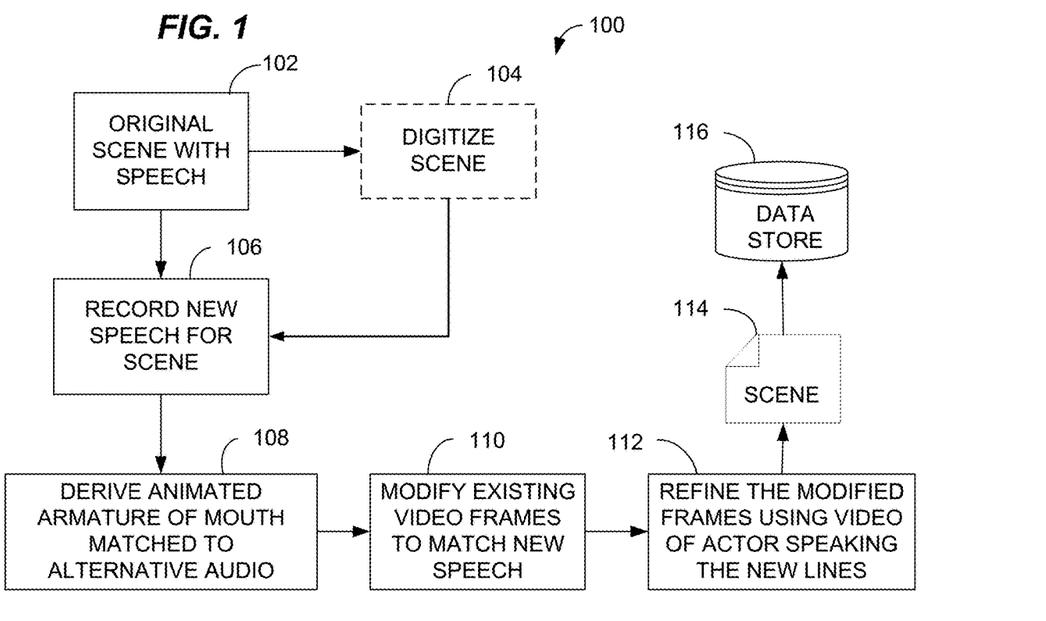
FIG. 1 is a schematic diagram illustrating an overview of matching mouth shape and movement in digital video to alternative audio.

FIG. 1 shows an overview of matching mouth shape and movement in digital video to alternative audio 100 in digital video by one or more computer processors. As known in the art, movement is animated in video by a sequence of images, which may be photographic, computer generated, hand drawn, or any combination of the foregoing. At 102, an original or "input" scene is recorded by an audio-video recording system in digital audio-video. The recorded scene includes images of an actor speaking original lines or impromptu speech (e.g., as dialog or monologue) recorded in an audio track. Optionally, if the source audio-video is in an analog (e.g., film) format, the analog recordings may be converted to digital audio-video at 104 by an analog-to-digital converter. In fact, one use case for the present technology includes dubbing new translations and dialog into old films produced before the digital age. The technology is also useful for newer original digital content. At 106, an audio recorder records new and different speech 106, that a producer desires to replace the original audio with speech used in the scene. The following three processes 108, 110, 112 will be described in more detail in FIGS. 4-9 and correspond to three essential operations for causing the shape and movement of the actor's mouth to match the replacement speech. The present technology includes matching both the shape and timing of mouth movement to spoken word and is not limited to matching the timing of movement only.

At a high level, a first computer process 108 creates a sequence of facial poses including mouth shapes roughly synchronized when animated to the new speech; in other words, an animated armature of the actor's mouth that matches the desired alternative audio track. In some embodiments, the mouth shapes may be sparse and limited to keypoints extracted from the video frames and then normalized, wherein the processor determines the keypoint geometry to match the new audio. A second computer process 110 creates a rough approximation of a matched, digitally rendered audio-video file based on the pose sequence and a triplet of neural network processes for mouth movement, facial expression and mesh pose. A third computer process 112 refines the modified frames based on digitally rendered video of model speaking the replacement speech or its underlying animated mesh using another machine-learning process. The sequence of processes 108-110-112 outputs audio-video of the scene 114 that can be stored in a production database for editing and compiling into video content for distribution through any suitable channel.

Figure 2:
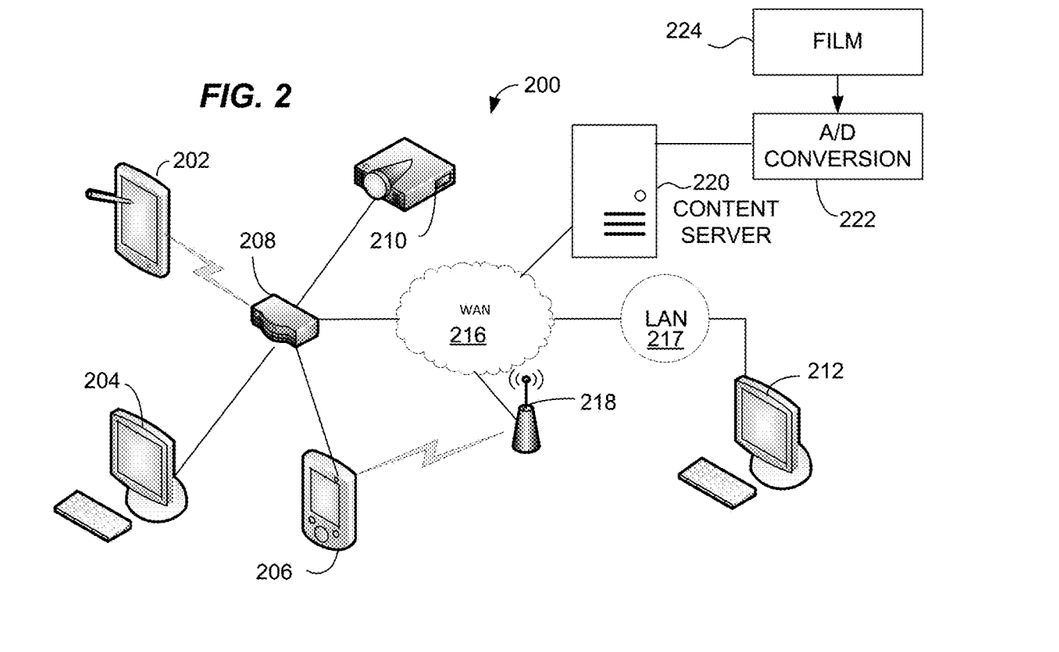
FIG. 2 is a block diagram illustrating an example of a computer network in which the novel methods and apparatus of the application may find use.

FIG. 2 shows a computer network 200 in which the novel methods and apparatus of the application may find use. One or more digital signal processors 212 (e.g., a server farm or cloud) interconnected through a local area network, wide area network 216, or other network may execute the processes and algorithms described herein, producing altered digital audio-video that may be stored and distributed from a content server 220. In some embodiments, analog (e.g., film) content 224 is converted to digital form using any suitable conversion process, for example, digital scanning. Content for processing or delivery to consumers may be pulled or pushed to a variety of clients from the content server 220 through the WAN 216 and one or more wireless networks 218, e.g., cellular telephone and data networks, and one or more router/modems/hotspots 208. Clients for playing the altered audio-video content may include, for example, smart phones 206, personal computers 204, notepad devices 202, projectors 210 and wearable virtual reality or augmented reality devices (not shown). The altered audio-video may be transcoded to a suitable format for the destination device prior to delivery.

Figure 3:
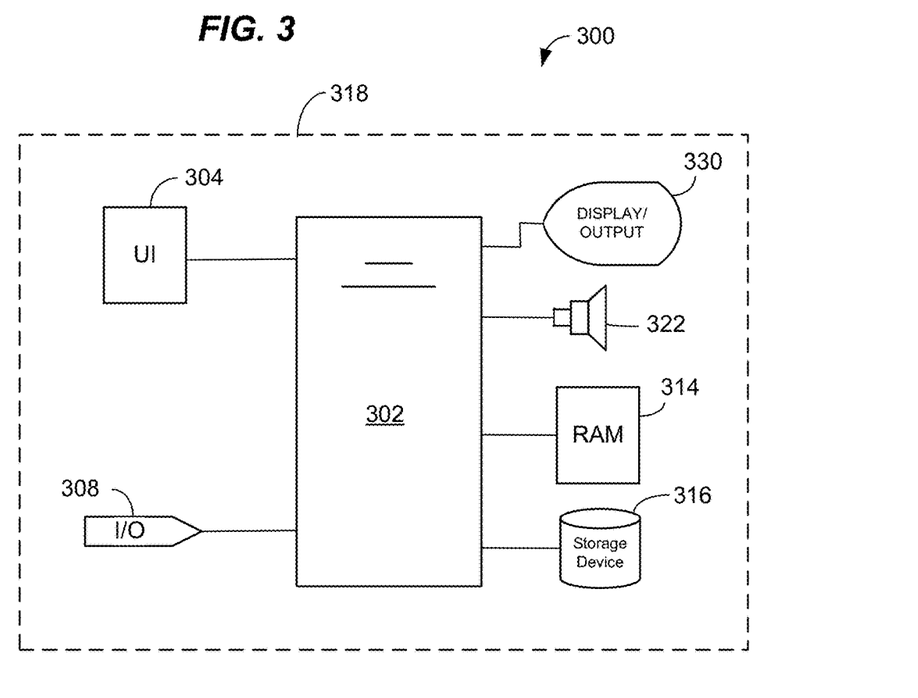
FIG. 3 is a schematic diagram illustrating a computer for performing operations of the present methods.

Referring to FIG. 3, a digital signal processor 300 may include a CPU 302 and random-access memory (RAM) 314 holding program instructions and data for execution and processing by the processor 300. When the apparatus 300 is powered off or in an inactive state, program instructions and data may be stored in a long-term memory, for example, a non-volatile magnetic, optical, or electronic memory storage device 316. Either or both of the RAM 314 or the storage device 316 may comprise a non-transitory computer-readable medium holding program instructions, that when executed by the processor 302, cause the apparatus 300 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether or not machine code on the bundle can be executed independently of other machine code. Other components of the apparatus 300 may include, for example, a display output 330, audio transducer 320, an input/output port 308 for connecting to a network, and a user interface device 304 for receiving user input that directs initiation of the processes described herein.

Figure 4:
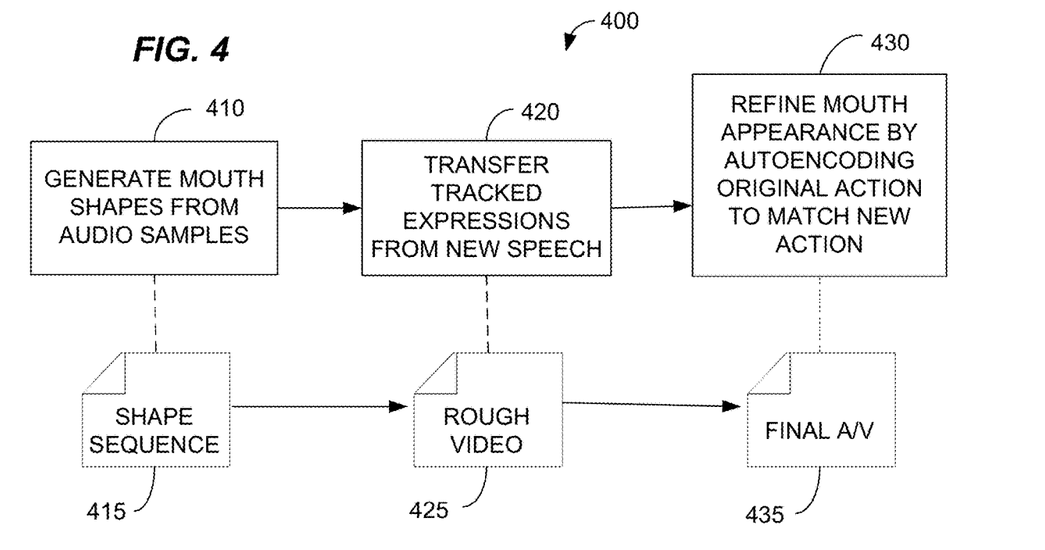
FIG. 4 is a block diagram illustrating a concise overview of a method for matching mouth shape and movement in digital video to alternative audio after initial capture of images and sound.

FIG. 4 diagrams a useful three-process automatic method 400 for matching mouth shape and movement in digital video to alternative audio after video and audio capture. At 410, a processor generates an animated armature-like data structure for the speaker's mouth 415 in the source video, which may also be called a shape sequence or sparse geometry sequence. The sequence 415 is not, strictly speaking, an armature for use in an animated process but is an equivalent data structure that is mappable to an armature.

The shape sequence may be optimized for use in the following process 420 for generating a rough video 425. At 420, the processor executes a complex, multi-step automatic process that tracks expression animation and mouth morphology and movement inferred from the alternative audio and transfers the morphology and movements to the source video. In some embodiments, the process 420 generates an animated facial mesh with emotional expression inferred from the replacement audio, and renders the animated mesh into a reference video. The reference video may also be called a target video. In other embodiments, the target video may be created at the time the alternative audio is generated, by video recording the actor speaking the new lines. The processor then refines, at 430, the appearance of the mouth in the rough video 425 using a machine-learning autoencoder trained by images of mouth action in the reference video. The autoencoder process 430 refines the shape and appearance of the mouth to more closely match the reference video for the alternative audio. The resulting final audio-video clip 435 reduces mismatch (error) below perceivable levels for most or all audience members, thereby achieving the objectives discussed herein above. Further details of the processes 410, 420 and 430 are described in connection with FIGS. 5-8 below.

Figure 5:
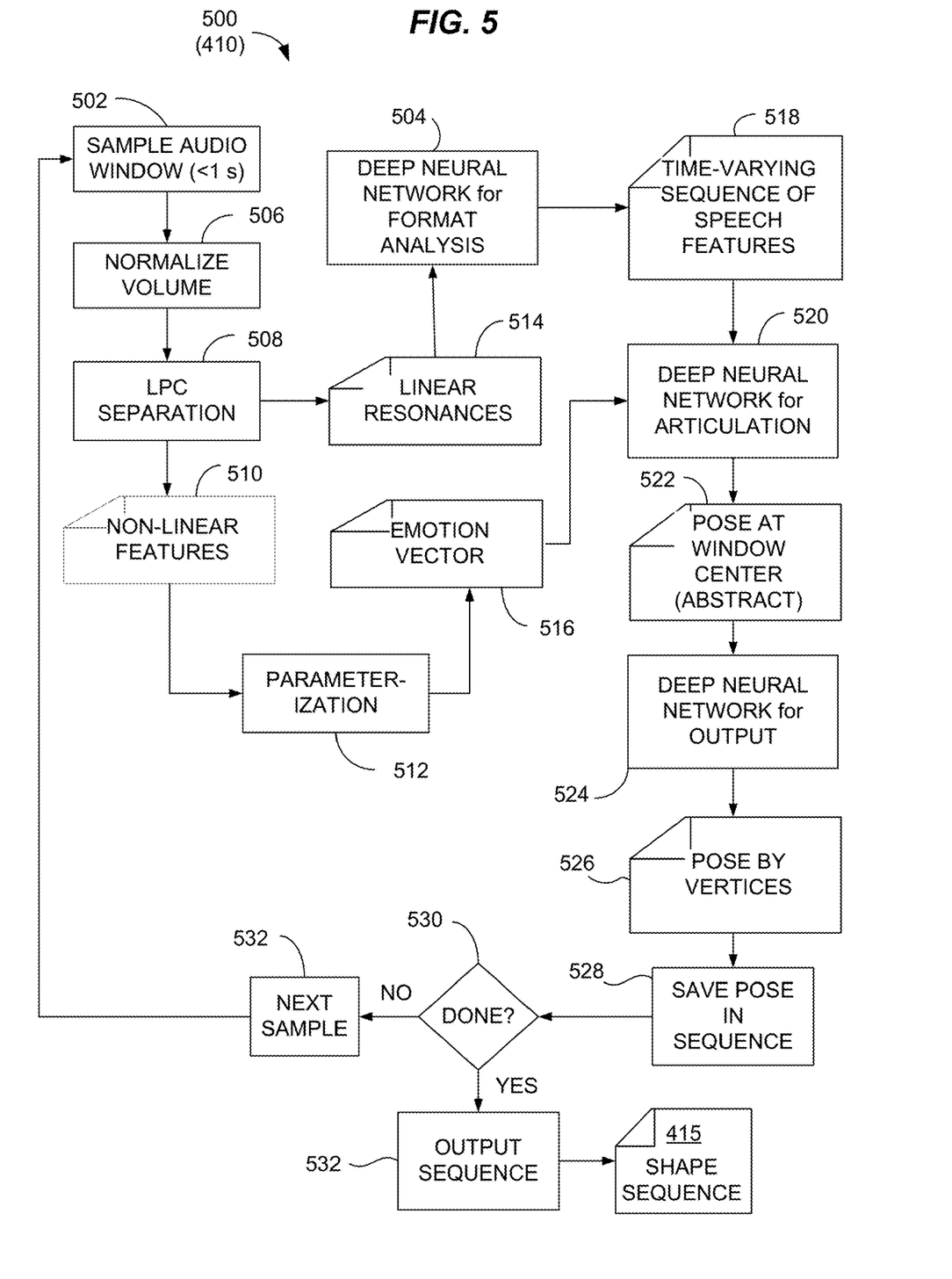
FIG. 5-8 are flow diagrams illustrating more detailed aspects of the method diagrammed in FIG. 4.

FIG. 5 diagrams a process 500 (410) for generating a sequence of facial poses including mouth shapes from the desired alternate audio for use in downstream video processing. The process 500 borrows certain elements from image processing techniques more fully explained by Karras et al. in Audio-Driven Facial Animation by Joint End-to-End Learning of Pose and Emotion, ACM Transactions on Graphics, Vol. 36, No. 4, Article 94 (July 2017). Alternative methods for generating mouth shapes from text or recorded audio are disclosed by Suwajanakorn et al. in *Synthesizing Obama: Learning Lip Sync from Audio*, ACM Transactions on Graphics, Vol. 36, No. 4, Article 95 (July 2017) and by Kumar et al. in *ObamaNet: Photo-realistic lip-sync from text*, 31st Conference on Neural Information Processing Systems (NIPS 2017), Long Beach, Calif. The techniques described by Karras et al. may be most useful for the process 500, but other techniques may be substituted. The methods of Suwajanakorn et al. and Kumar et al. do not treat modification of facial expression to match alternative audio and hence, are less comprehensive in scope than the techniques described by Karras et al. but may still be useful depending on the application.

The process 500 operates by sampling the alternative audio 502, breaking it into a continuous sequence of consecutive audio windows each less than one second, for example, 0.5 seconds. At 506, the processor normalizes the volume of each audio window so that the alternative audio utilizes the full dynamic range of the chosen audio format (e.g., 16 kHz mono). Modeling the audio input as a combination of a linear filter (vocal tract) and excitation signal (vocal cords), at 508, the processor separates the resonance frequencies (formats) into linear resonances 514 carrying phoneme information and non-linear features 510 mappable to emotional states by linear predictive coding (LPC). Other useful separation processes may include, for example, Mel-frequency cepstral coefficients (MFCC), and perceptual linear prediction (PLP).

The processor applies a deep neural network 504 to derive a time-varying sequence of speech features 518 (e.g., phoneme morphologies). The processor parameterizes 512 the non-linear features by any useful model for representing an emotional state of the actor. For inferring emotion and facial pose from audio data, Karras et al. teach a data-driven, machine learning process that produces an n-dimension emotion vector 516 representing an emotional state of the actor, wherein 'n' is large enough to represent emotional states that affect facial expression during speech but not so large as to render the training process too specialized to the input. Manual coding of emotional states may provide another option, or generating the emotion vector from other data, for example, non-photographic biometric data collected during recording of the reference video. Any useful method may be used to derive emotion data 516 time-correlated to the actor speaking the lines in the reference video, if used. Addition of the emotional state vector 516 and an input to the articulation mapping 520 enables convincing use of alternative audio that conveys different emotions than the original performance.

The processor inputs the speech features 518 and the emotion vector 516 to a deep neural network process for facial articulation 520, which outputs an abstract numeric representation of a facial pose at the center (midpoint) of each sample's audio window. The abstract representation is optimized for use in a third neural network process 524 that generates a geometric mesh of vertices 526 useful for three-dimensional (3D) rendering. In a more efficient alternative, the processor may generate other shape information (e.g., a 2D vertex set representing a two-dimensional projection or other mapping of mouth pose) optimized for use in downstream neural net processing, as the pose sequence 526 is not yet useful as final output. The processor saves the pose mesh 524 in a chosen format for the sample window in a computer memory with sequence information for building a renderable animated model. At 530, the processor checks conditions for continued looping; if the desired pose sequence is not completed the processor selects the next audio sample 532 and repeats the loop just described.

Once the sequence is completed, the processor generates and outputs 532 the shape sequence 415 in consecutive order for use in downstream processing.

Figure 6:
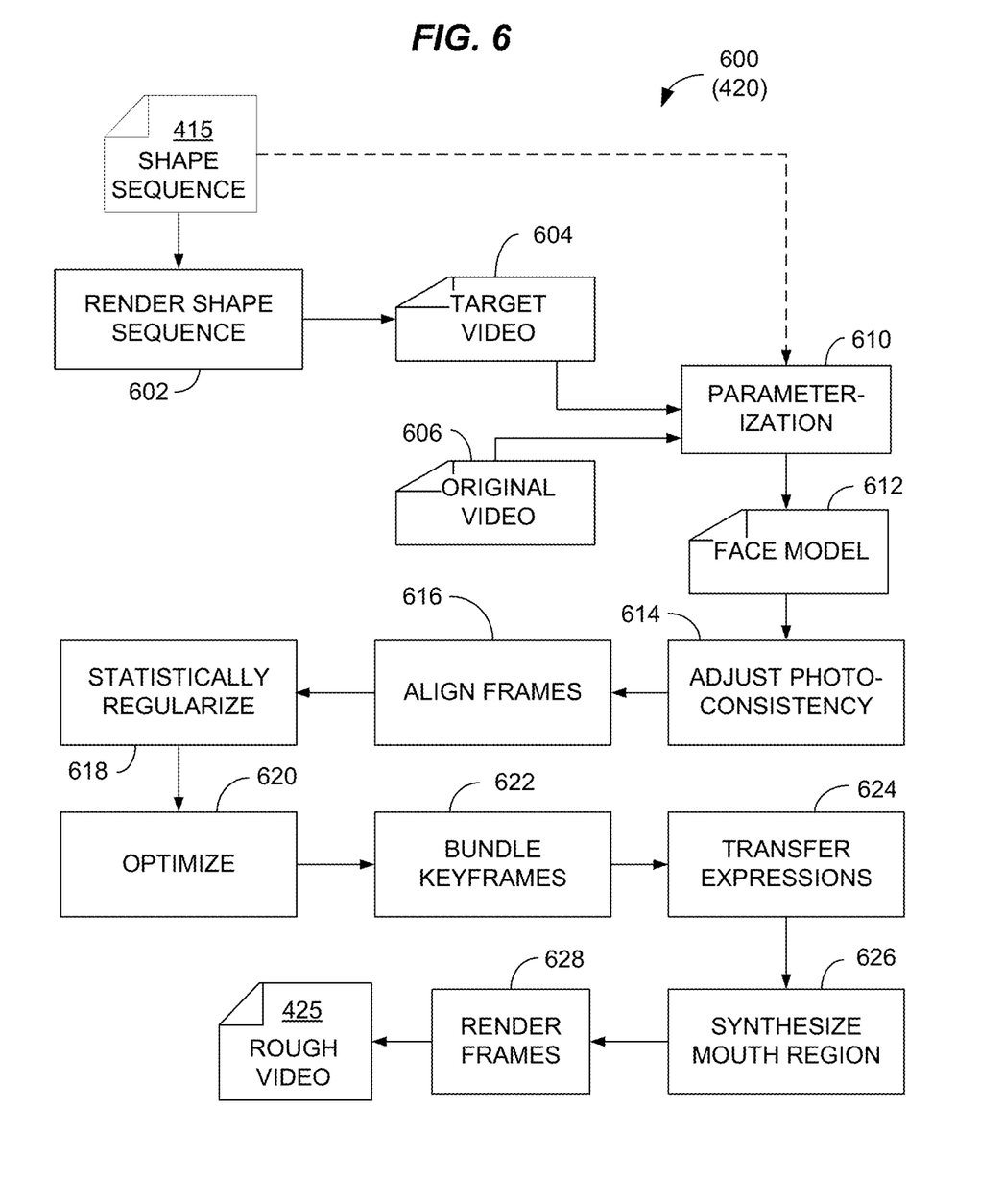

Referring to FIG. 6, the processor uses the shape sequence 415 in a process 600 (420) for tracking expression animation and mouth morphology and movement in a reference video of an actor speaking replacement lines and transferring the morphology and movements from the reference video to the source video. The process 600 may use certain technical features described by Nießner et al. in *Face2Face: Real-time Face Capture and Reenactment of RGB Videos*, Stanford University 2016 (downloaded from https://web.stanford.edu/~zollhoef/papers/CVP_R2016_Face2Face/paper.pdf). Nießner et al. describe a process in which producer records or obtains a video of an actor delivering the lines making up the alternative video and edits the video to create a target video 604 that correlates to the original video 606 to be modified. The processor provides these two input videos 604, 606 with the shape sequence 415 to a parametrization operation 610 that generates a parametrized face model 612. Nießner et al. describe a 3D model generated by principle component analysis (PCA) with 53,000 vertices and 102,000 faces. The exact number of vertices and faces is not critical. The PCA process as described by Nießner et al. may be adapted depending on the size and resolution of the video to be processed. Higher resolution video may require a higher resolution model, for example. In the process 600, the shape sequence 415 replaces or augments the face tracking described by Nießner et al.

In contrast to Nießner et al., the present technology does not require a video of an actor speaking replacement lines. Instead, a reference video 604 can rendered 602 from the animated sequence of facial poses (shape sequence 415)

generated using the process 500. In an alternative, the process of Nießner et al. can be modified to use the shape sequence 415 and associated metadata for parameterization 610, without an intermediate rendering step 602 to produce a reference video 604. For example, the parametrized face model may be derived from the shape sequence 415 instead of from RGB images captured from target video data. Either way, generating the sequence of facial poses instead of hiring and recording actors may enable more cost-effective processing of legacy video content, both analog and digital, including feature-length cinematic content.

Once the face model is parametrized, the processor performs several operations for regularizing arbitrary differences between the target video 604 and the original video 606. At 614, the processor adjusts the image parameters of the face model to match the original video. At 616, the processor aligns the frames of the rendered face model so the rendered face is in the closest possible alignment with the speaking actor's face in the original video. At 618, the processor statistically regularizes the face model to facilitate plausibility of synthesized faces appearing in the output rough video based on the assumption of a normal distributed population, by setting parameters for synthesizing faces close to a population mean. At 620, the processor performs an unconstrained non-linear optimization of the face model using a data-parallel GPU based on an Iteratively Reweighted Least Squares (IRLS) solver or other suitable optimization method. At 622, the processor bundles keyframes for solving the optimization algorithm over sets of adjacent keyframes. At 624, the processor transfers expressions from the target video to the face model. The processor may use a subspace deformation transfer technique as taught by Nießner et al. At 626, the processor synthesizes a realistic mouth region based on the mouth as appearing in the target video, by finding the best-fitting frame for the mouth. Nießner et al. provide a detailed description. At 628, the processor renders the face model for each frame and stitches the rendered face model into its home frame. The rendered and stitched frames are saved as the rough output video 425.

Figure 7:
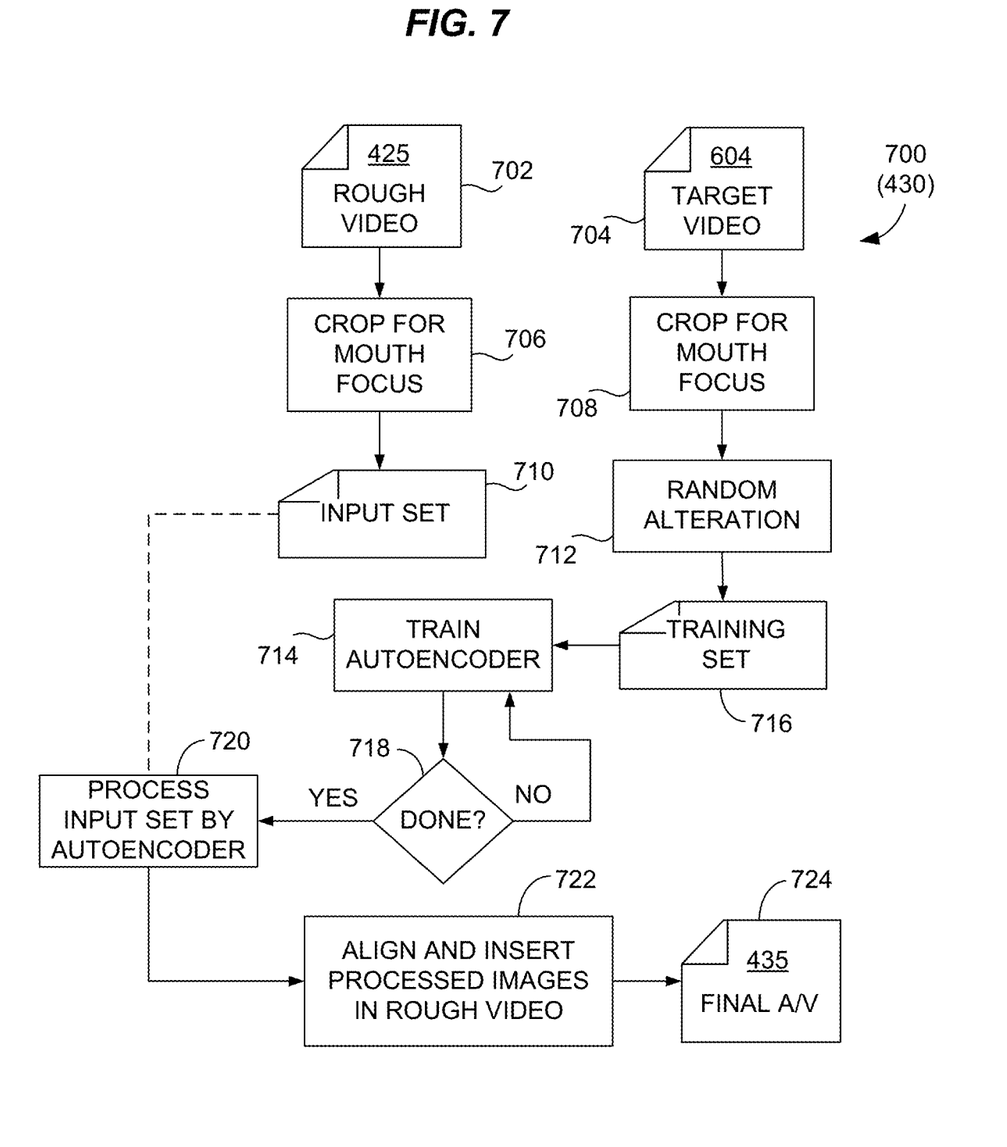

After the rough video 425 is created, the automatic refinement process 700 is ready for execution by a digital signal processor, taking as inputs the rough video 425 and the target video 604 of an actor speaking the replacement lines with similar pose and image parameters as the original video. The processor may automatically crop both videos 425, 604 using automatic features to exclude parts of each frame except for the mouth, lips and adjacent parts of the cheeks, jaw and upper lip. The processor introduces random or systematic errors 712 into a training set 716 of images created from the target video 604 and uses the training set 716 to train a machine-learning (e.g., neural network) autoencoder 714. Once training is completed 718, the processor processes 720 the cropped input set 706 by the trained autoencoder 830 (FIG. 8) from the training process 714. This process causes the autoencoder to alter the input set 710 as if differences between it and the training set 716 were errors. The resulting corrected input set is thereby conformed to the training set 716, and by logical extension to the target video 704. The processor then generates finished audio-video clip 724 by aligning and inserting 722 the processed input set into the rough video 702 as replacement for the originally extracted input set. Various alignment methods are known in the art, and alignment errors will be small or zero because the processed input set is derived from the images it is inserted into. The finished video 724 conforms closely to the altered speech while all the processing is automatic and feasible without extraordinary expenditures.

Figure 8:
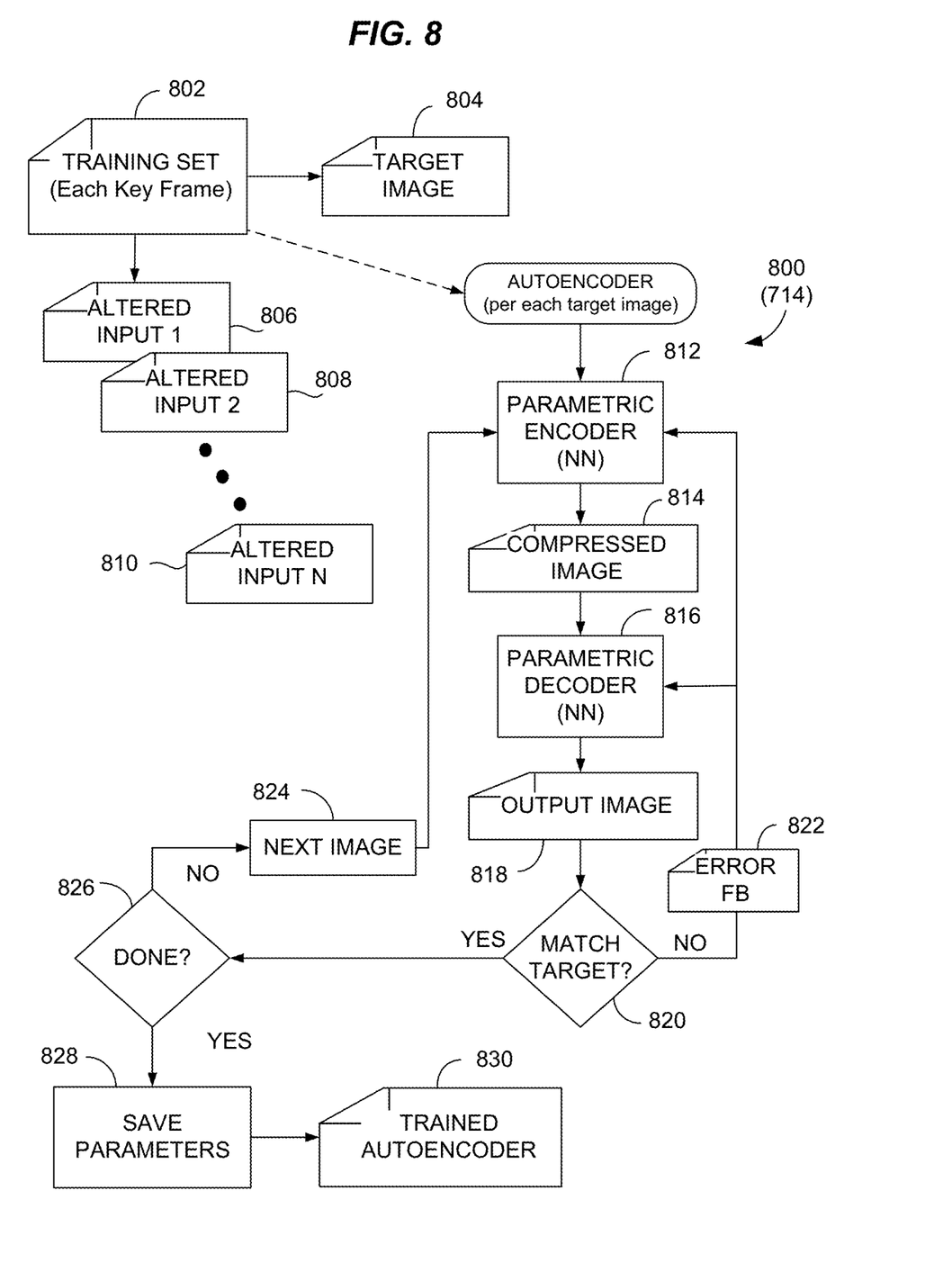

FIG. 8 illustrates an autoencoding training process 800 (714) adapted for generating a trained autoencoder 830 for use in the method 700. Autoencoding includes algorithms that perform compression and decompression functions on the same content are 1) data-specific, 2) lossy, and 3) learned automatically from examples rather than predefined. As used herein "autoencoder" includes only modules in which machine learning algorithms (for example neural networks) perform the compression and decompression functions. The open-source program "Deepfakes" (https://github.com/deepfakes) is an example of an autoencoder that may be adapted for use in the process 800, as of May 2018.

Data specificity means that the autoencoder can only process data that is similar to what its machine-learning algorithms have been trained on. In contrast, many signal processing algorithms (e.g., MP3, MPEG-4, H.264, H.265, etc.) use predefined rulesets that are data-agnostic except for requiring that the data conform to a specification defined for its format. An autoencoder trained on images of faces would garble images of automobiles, for example, because it would be parametrized through its training to process to process face-specific features. Lossy means that image degradation—a form of alteration—occurs during the autoencoding process. The lossy attribute enables the autoencoder to introduce alterations to compensate for different inputs. The autoencoder can be trained to reduce degradation below human-perceptible levels.

Autoencoders include an encoding function 812 and a decoding function 816 characterized by a distance function (not shown) that defines information loss between input data after compression and the autoencoder's decompressed output. Distance functions may also be called "loss" or "error" functions. Loss functions may include, for example, mean squared error between input and output pixels of an input image. The encoder 812 and decoder 816 are parametric functions such as, for example, neural networks differentiable with respect to their distance function. Thus, the autoencoder can and should be parametrized to minimize processing loss using any suitable error minimization method, for example Stochastic Gradient Descent.

The autoencoding process 800 may operate as follows. Prior to use, the autoencoder is parametrized (meaning its parameters are configured) by machine learning based on the training set 802, which may include a set of images for each frame, or for selected frames, of the target video 604. As described in connection with FIG. 7 above, the input images may be cropped to only contain images of the speaker's mouth. An automatic process may generate or more altered images 806, 808, 810 from each target image 804, introducing random and/or systematic distortions that may approximate in form and scale similar differences between the mouth shape and movement appearing in the rough video 425 and the target video 804. The autoencoding process 800 processes each altered input image and adjusts its parameters to minimize error between the target image and respective altered input images. The parametric encoder 812 compresses the altered image (e.g., inputs 1 through N 806, 808, 810, in turn) creating for each input image a compressed image 814. The parametric decoder 816 decompresses the compressed image 814 creating an output image 818.

An error measurement and minimization process 820 measures the distance (error or loss) between the target image 804 and the output image 818. Unless and until the error falls below a threshold value, error feedback in the form parameter adjustments is provided to the encoding 812 and decoding 816 processes, and the input image is reprocessed. After the error is minimized, the process 800 may pick the next image in its training set 824 and repeat the process just described. Similar repetition occurs until the all the images in the training set have been processed 826. Then, the autoencoder's parameters are saved in a suitable file format 830 and the autoencoder 830 is ready for use in the process 700 described in connection with FIG. 7 above.

Figure 9:
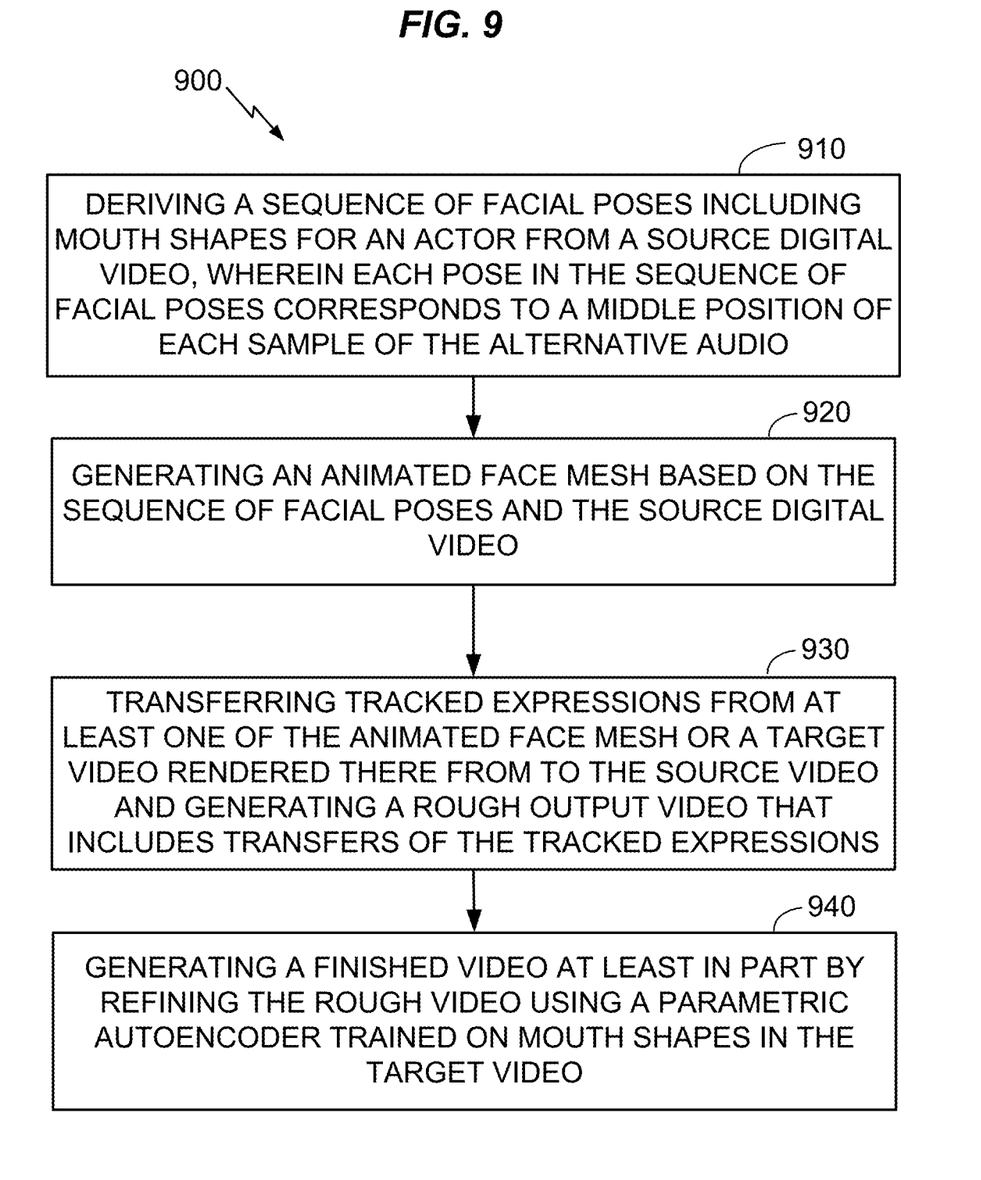
FIG. 9 is a flow chart illustrating the method and operations of FIG. 4 using alternative phrasing.

In accordance with the foregoing, and by way of additional example, FIG. 9 shows more general aspects of a method or methods 900 according to one embodiment, as may be performed by a computer adapted for machine learning and digital signal processing, including digital audio and video. It should be appreciated that the more general operations of method 900 may include or embody more detailed aspects of corresponding methods described herein above.

Referring to FIG. 9, a computer-implemented method 900 for matching mouth shape and movement in digital video to alternative audio after video and audio capture may include, at 910, deriving, by at least one computer processor, a sequence of facial poses including mouth shapes for an actor from a source digital video in which the actor appears, wherein each pose in the sequence of facial poses corresponds to a middle position of each of the samples. As used herein, a "middle position" includes a midpoint, and adjacent points biased towards the midpoint. While the midpoint is believed optimal, nearby positions may also provide useful results. The method may further include, at 920, generating, by the at least one processor, an animated face mesh based on the sequence of facial poses and the source digital video. In some embodiments, the method may include generating a target video from the animated face mesh that depicts the facial expressions of the mesh in rough alignment and photo-correspondence to the source video. The method may further include, at 930, transferring by the at least one processor tracked expressions from at least one of the animated face mesh or a target video to the source video and generating a rough output video that includes transfers of the tracked expressions. More detailed description of the operation 920 and 930 are shown and described in connection with FIG. 6 above. The method may further include generating, by the at least one processor, a finished video at least in part by refining the rough video using a parametric autoencoder trained on mouth shapes in the target video.

The at least one processor may perform additional operations, for example encoding the finished video and audio in a non-transitory computer-readable medium for storage and distribution, or additional operations and described in connection with FIGS. 4-8 above or immediately below. Each of these additional operations is not necessarily performed in every embodiment of the method, and the presence of any one of the operations does not necessarily require that any other of these additional operations also be performed. All operations are performed automatically by a computer processor under control of one or more algorithms or procedures encoded in a computer memory.

In an aspect, generating the sequence of facial poses may further include sampling a sequence of audio samples taken from a recording of spoken dialog. In some embodiments, generating the sequence of facial poses may include converting text to speech using a text-to-speech synthesizer.

In addition, generating the sequence of facial poses may further include extracting keypoints for the facial poses from an image of the actor, normalizing the keypoints, and applying principle component analysis (PCA) to normalized keypoints to derive the facial poses. Generating the sequence of facial poses may further include deriving a mel-frequency cepstral coefficient (MFCC) for each of the samples and mapping each MFCC coefficient to one of the mouth shapes using a recurrent neural network.

In other embodiments described in connection with FIG. 5 above, generating the sequence of mouth shapes may further comprises separating linear features from non-linear features, generating a time-varying sequence of speech features by processing the linear features with a deep neural network for format analysis, and generating a facial pose at the middle position by processing the non-linear features with deep neural network for facial articulation. In a related aspect, generating the sequence of facial poses including mouth shapes may further include generating a vertex-defined facial pose by a deep neural network for output and saving the pose in the sequence of facial poses.

In other embodiments, transferring tracked expressions from the target video to the source video may further synthesizing the mouth region and rendering each frame of the rough output video, as also shown and described at FIG. 6.

In another aspect, refining the rough video using a parametric auto encoder trained on mouth shapes in the target video may further include generating a training set for the autoencoder by random alteration of frames in the target set, as shown and described in connection with FIG. 7. Refining the rough video using a parametric auto encoder trained on mouth shapes in the target video may further include cropping corresponding areas of the rough output video and the target video around the actor's mouth. In a related aspect, refining the rough video using a parametric auto encoder trained on mouth shapes in the target video may further include aligning and inserting processed images from the target video into the rough output video.

Figure 10:
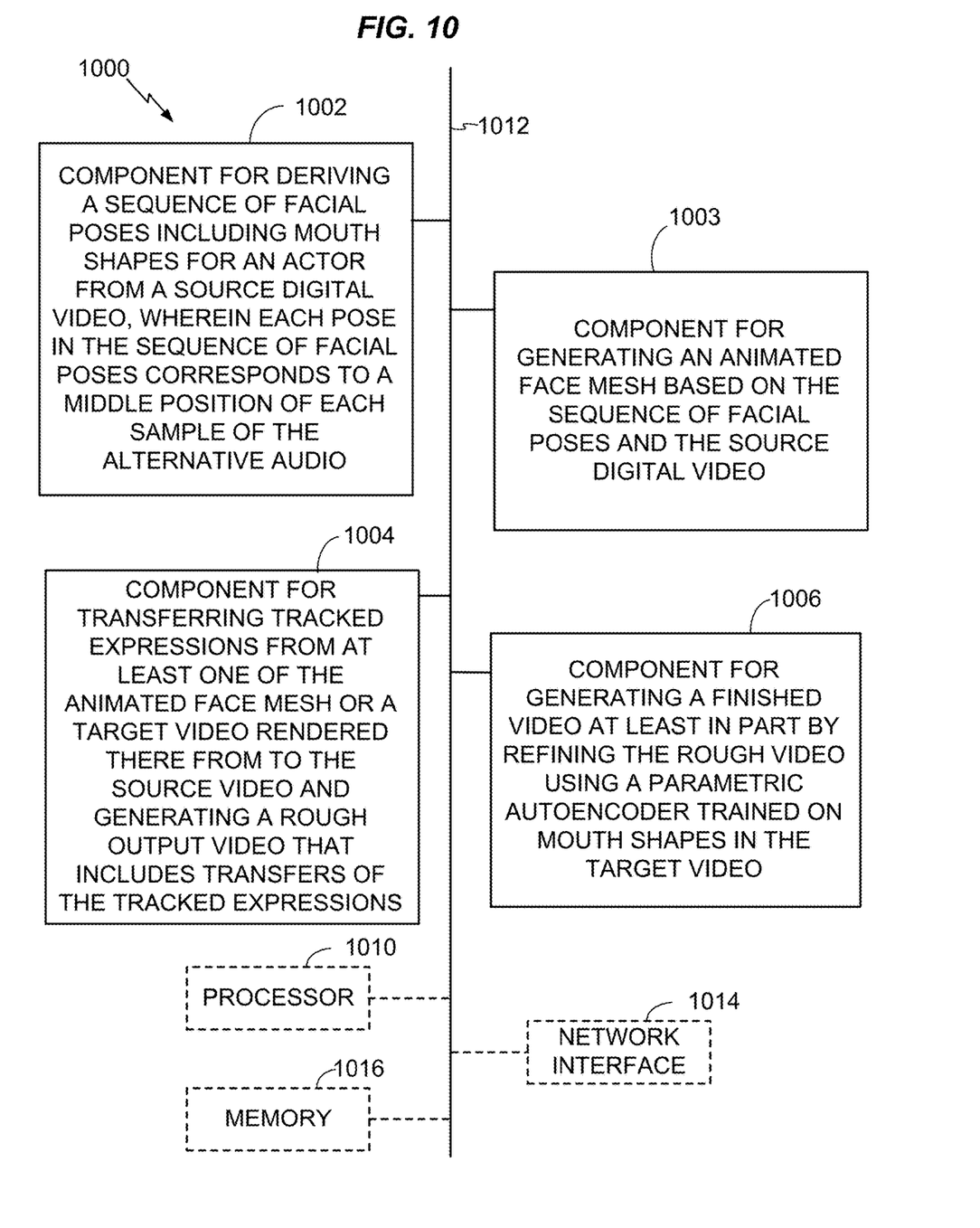
FIG. 10 is a conceptual block diagram illustrating components of an apparatus or system for the method as shown in FIG. 9.

FIG. 10 is a conceptual block diagram illustrating components of an apparatus or system 1000 for synchronizing altered speech and mouth movement after audio-video capture as described herein, according to one embodiment. As depicted, the apparatus or system 1000 may include functional blocks that can represent functions implemented by a processor, software, or combination thereof (e.g., firmware).

As illustrated in FIG. 10, the apparatus or system 1000 may comprise an electrical component 1002 for deriving a sequence of facial poses including mouth shapes for an actor from a source digital video in which the actor appears, wherein each pose in the sequence of facial poses corresponds to a middle position of each of the samples. The component 1002 may be, or may include, a means for said deriving. Said means may include the processor 1010 coupled to the memory 1016, and to the input device 1014, the processor executing an algorithm based on program instructions stored in the memory. Such algorithm may include a sequence of more detailed operations, for example, as described in connection with FIG. 5 above.

The apparatus or system 1000 may further comprise an electrical component 1003 for generating an animated face mesh based on the sequence of facial poses and the source digital video. The component 1003 may be, or may include, a means for said mesh generating. Said means may include the processor 1010 coupled to the memory 1016, and to the input device 1014, the processor executing an algorithm based on program instructions stored in the memory. Such algorithm may include a sequence of more detailed operations, for example, as described in connection with block 602 of FIG. 6. The processor may render the target video before or after parametrizing the face model as described at 612 of FIG. 6.

The apparatus or system 1000 may further comprise an electrical component 1004 for transferring tracked expressions from at least one of the animated face mesh or the target video to the source video based in part on the geometric face model, and generating a rough output video that includes transfers of the tracked expressions. The component 1004 may be, or may include, a means for said transferring and generating. Said means may include the processor 1010 coupled to the memory 1016, and to the input device 1014, the processor executing an algorithm based on program instructions stored in the memory. Such algorithm may include a sequence of more detailed operations, for example, as shown and described in connection with blocks 624-628 of FIG. 6.

The apparatus or system 1000 may further comprise an electrical component 1006 for generating a finished video at least in part by refining the rough video using a parametric autoencoder trained on mouth shapes in the animated face mesh or in the target video. The component 1006 may be, or may include, a means for said generating. Said means may include the processor 1010 coupled to the memory 1016, and to the input device 1014, the processor executing an algorithm based on program instructions stored in the memory. Such algorithm may include a sequence of more detailed operations, for example, as shown and described in connection with FIGS. 7 and 8, wherein FIG. 7 shows application of an autoencoder for refinement of a mouth portion of altered video, and FIG. 8 shows aspects and operations of a useful autoencoder.

The apparatus 1000 may optionally include a processor module 1010 having at least one processor, in the case of the apparatus 1000 configured as a digital signal processor. The processor 1010, in such case, may be in operative communication with the modules 1002-1006 via a bus 1012 or other communication coupling, for example, a network. The processor 1010 may initiate and schedule the functions performed by electrical components 1002-1006.

In related aspects, the apparatus 1000 may include a network interface module 1014 operable for communicating with a storage device over a computer network. In further related aspects, the apparatus 1000 may optionally include a module for storing information, such as, for example, a memory device/module 1016. The computer readable medium or the memory module 1016 may be operatively coupled to the other components of the apparatus 1000 via the bus 1012 or the like. The memory module 1016 may be adapted to store computer readable instructions and data for effecting the processes and behavior of the modules 1002-1006, and subcomponents thereof, or the processor 1010, or the methods 400-800, or one or more of the additional operations described in connection with the method 900. The memory module 1016 may retain instructions for executing functions associated with the modules 1002-1006. While shown as being external to the memory 1016, it is to be understood that the modules 1002-1006 can exist within the memory 1016.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method for matching mouth shape and movement in digital video to alternative audio, the method comprising:
    deriving a sequence of facial poses including mouth shapes for an actor from a source digital video, wherein each pose in the sequence of facial poses corresponds to a middle position of each sample of the alternative audio, at least in part by sampling a sequence of audio samples taken from a recording of spoken dialog, separating linear features from non-linear features, generating a time-varying sequence of speech features by processing the linear features with a deep neural network for format analysis, and generating a facial pose at the middle position by processing the non-linear features with deep neural network for facial articulation;
    generating an animated face mesh based on the sequence of facial poses and the source digital video;
    transferring tracked expressions from at least one of the animated face mesh or a target video rendered therefrom to the source video and generating a rough output video that includes transfers of the tracked expressions; and
    generating a finished video at least in part by refining the rough video using a parametric autoencoder trained on mouth shapes in the animated face mesh or the target video.

2. The method of claim 1, wherein deriving the sequence of facial poses comprises converting text to speech using a text-to-speech synthesizer.

3. The method of claim 2, wherein deriving the sequence of facial poses further comprises extracting keypoints for the mouth shapes from an image of the actor, normalizing the keypoints, and applying principle component analysis (PCA) to normalized keypoints to derive the mouth shapes.

4. The method of claim 3, wherein deriving the sequence of facial poses further comprises deriving a mel-frequency cepstral coefficient (MFCC) for each of the samples and mapping each MFCC coefficient to one of the mouth shapes using a recurrent neural network.

5. The method of claim 1, wherein deriving the sequence of facial poses further comprises generating a vertex-defined facial pose by a deep neural network for output and saving the pose in the sequence of facial poses.

6. The method of claim 1, wherein transferring tracked expressions from the target video to the source video further comprises synthesizing the mouth region and rendering each frame of the rough output video.

7. The method of claim 1, wherein refining the rough video using a parametric auto encoder trained on mouth shapes in the target video further comprises generating a training set for the autoencoder by random alteration of frames in the target set.

8. The method of claim 1, wherein refining the rough video using a parametric auto encoder trained on mouth shapes in the target video further comprises cropping corresponding areas of the rough output video and the target video around the actor's mouth.

9. The method of claim 1, wherein refining the rough video using a parametric auto encoder trained on mouth shapes in the target video further comprises aligning and inserting processed images from the target video into the rough output video.

10. The method of claim 1, further comprising rendering a target video from the animated face mesh, wherein transferring the tracked expressions includes transferring the expressions from the target video to the source video.

11. An apparatus for matching mouth shape and movement in digital video to alternative audio, comprising a processor coupled to a computer memory, the memory holding program instructions that when executed by the processor cause the apparatus to perform:
    deriving a sequence of facial poses including mouth shapes for an actor from a source digital video, wherein each pose in the sequence of facial poses corresponds to a middle position of each sample of the alternative audio, at least in part by sampling a sequence of audio samples taken from a recording of spoken dialog, separating linear features from non-linear features, generating a time-varying sequence of speech features by processing the linear features with a deep neural network for format analysis, and generating a facial pose at the middle position by processing the non-linear features with deep neural network for facial articulation;
    generating an animated face mesh based on the sequence of facial poses and the source digital video;
    transferring tracked expressions from at least one of animated face mesh or a target video rendered there from to the source video and generating a rough output video that includes transfers of the tracked expressions; and
    generating a finished video at least in part by refining the rough video using a parametric autoencoder trained on mouth shapes in the animated face mesh or the target video.

12. The apparatus of claim 11, wherein the memory holds further instructions for deriving the sequence of facial poses at least in part by converting text to speech using a text-to-speech synthesizer.

13. The apparatus of claim 12, wherein the memory holds further instructions for deriving the sequence of facial poses at least in part by extracting keypoints for the mouth shapes from an image of the actor, normalizing the keypoints, and applying principle component analysis (PCA) to normalized keypoints to derive the mouth shapes.

14. The apparatus of claim 13, wherein the memory holds further instructions for deriving the sequence of facial poses at least in part by deriving a mel-frequency cepstral coefficient (MFCC) for each of the samples and mapping each MFCC coefficient to one of the mouth shapes using a recurrent neural network.

15. The apparatus of claim 11, wherein the memory holds further instructions for deriving the sequence of facial poses at least in part by generating a vertex-defined facial pose by a deep neural network for output and saving the pose in the sequence of facial poses.

16. The apparatus of claim 11, wherein the memory holds further instructions for transferring tracked expressions from the target video to the source video at least in part by synthesizing the mouth region and rendering each frame of the rough output video.

17. The apparatus of claim 11, wherein the memory holds further instructions for refining the rough video using a parametric auto encoder trained on mouth shapes in the target video at least in part by generating a training set for the autoencoder by random alteration of frames in the target set.

18. The apparatus of claim 11, wherein the memory holds further instructions for refining the rough video using a parametric auto encoder trained on mouth shapes in the target video at least in part by cropping corresponding areas of the rough output video and the target video around the actor's mouth.

19. The apparatus of claim 11, wherein the memory holds further instructions for refining the rough video using a parametric auto encoder trained on mouth shapes in the target video at least in part by aligning and inserting processed images from the target video into the rough output video.

20. The apparatus of claim 11, wherein the memory holds further instructions for rendering a target video from the animated face mesh, wherein transferring the tracked expressions includes transferring the expressions from the target video to the source video.

21. A non-transitory computer-readable medium for matching mouth shape and movement in digital video to alternative audio encoded with program instructions that when executed by a computer, causes the computer to perform:
    deriving a sequence of facial poses including mouth shapes for an actor from a source digital video, wherein each pose in the sequence of facial poses corresponds to a middle position of each sample of the alternative audio, at least in part by sampling a sequence of audio samples taken from a recording of spoken dialog, separating linear features from non-linear features, generating a time-varying sequence of speech features by processing the linear features with a deep neural network for format analysis, and generating a facial pose at the middle position by processing the non-linear features with deep neural network for facial articulation;

generating an animated face mesh based on the sequence of facial poses and the source digital video;

transferring tracked expressions from at least one of animated face mesh or a target video rendered there from to the source video and generating a rough output video that includes transfers of the tracked expressions; and generating a finished video at least in part by refining the rough video using a parametric autoencoder trained on mouth shapes in the animated face mesh or the target video.

22. An apparatus for matching mouth shape and movement in digital video to alternative audio, comprising:
    means for deriving a sequence of facial poses including mouth shapes for an actor from a source digital video, wherein each pose in the sequence of facial poses corresponds to a middle position of each sample of the alternative audio, at least in part by sampling a sequence of audio samples taken from a recording of spoken dialog, separating linear features from non-linear features, generating a time-varying sequence of speech features by processing the linear features with a deep neural network for format analysis, and generating a facial pose at the middle position by processing the non-linear features with deep neural network for facial articulation;

means for generating an animated face mesh based on the sequence of facial poses and the source digital video;

means for transferring tracked expressions from at least one of animated face mesh or a target video rendered there from to the source video and generating a rough output video that includes transfers of the tracked expressions; and means for generating a finished video at least in part by refining the rough video using a parametric autoencoder trained on mouth shapes in the animated face mesh or the target video.

* * * * *